United States Patent [19]

Kennedy, Jr. et al.

[11] 4,008,931
[45] Feb. 22, 1977

[54] END PANEL CONSTRUCTION FOR MODULAR UNITS AND MODULAR UNIT EMBODYING THE END PANEL CONSTRUCTION

[75] Inventors: Robert J. Kennedy, Jr.; Kendall S. Smith, II, both of West Lafayette, Ind.

[73] Assignee: Lincoln Manufacturing Company, Inc., Fort Wayne, Ind.

[22] Filed: Sept. 17, 1975

[21] Appl. No.: 614,327

[52] U.S. Cl. .................................. 312/111; 52/591; 52/594; 312/250
[51] Int. Cl.² ........................................ F16B 12/00
[58] Field of Search ........... 46/24, 25, 216; 108/64; 297/248; 312/108, 111, 199, 201, 250, 107; 52/143, 591, 593, 594, 595

[56] References Cited

UNITED STATES PATENTS

| | | | |
|---|---|---|---|
| 713,577 | 11/1902 | Wickham | 52/594 |
| 2,565,823 | 8/1951 | Pool | 46/25 |
| 3,356,434 | 12/1967 | Theodores | 312/250 |

FOREIGN PATENTS OR APPLICATIONS 1,235,845  5/1960  France .......................... 312/107

*Primary Examiner*—Alfred C. Perham
*Attorney, Agent, or Firm*—Albert L. Jeffers; Roger M. Rickert

[57] ABSTRACT

An end panel construction for modular units in which a pair of end panels adapted to be mounted on opposite ends of a mobile modular counter unit or on the opposed ends of adjacent mobile modular counter units are complementarily contoured with vertical convolutions so as to nest together when placed in face to face relation. The end panels are also formed with transversely extending tongues and grooves which interfit when the panels are in face to face engagement and lock the panels together in vertical registration. The convolutions on the panels extend vertically thereon and in laterally spaced relation so that the two panels will nest together in a plurality of laterally adjusted positions while the tongues and grooves thereon will lock the panels together in all of the said adjusted positions.

17 Claims, 6 Drawing Figures

END PANEL CONSTRUCTION FOR MODULAR UNITS AND MODULAR UNIT EMBODYING THE END PANEL CONSTRUCTION

The present invention relates to an end panel construction for modular units and to a modular unit embodying such end panel constructions.

The invention, furthermore, is concerned with the provision of wheeled mobile modular counter units having end panels constructed according to the present invention and to the making up of serving lines, such as in a cafeteria and the like, by arranging the mobile modular counter units equipped with the end panel constructions according to the present invention in end to end relation.

It is common practice in food service establishments to set up cafeteria or buffet type serving lines in which units supporting the food to be served, or to be taken by customers, are arranged in end to end relation. With a cafeteria line, the customers generally move down one side of the row of units and are served by personnel from the other side of the row of units while, in a buffet style, customers will move down both sides of the row of units and serve themselves.

In the first case, there is usually an arrangement on the units for slidably supporting serving trays, and in the latter case, such an arrangement is provided along each side of the row of units.

In any case, it is often difficult to align the units properly with the upper surface in coplanar abutting relation. Sometimes, for example, the supporting surface on which the unit rests is not level and causes misalignment of the top surface of the units as well as the arrangement for slidably supporting the trays.

Further, in such a system, it is advantageous for the units to be supported with wheels so as to be readily movable and problems can sometimes present themselves in keeping the units firmly abutted together in end to end relation.

It is also the case that it is sometimes desirable for such a row of units to be arranged in a stepped pattern rather than in a straight line, and there has not, heretofore, been any known arrangement provided for locating mobile units in such a stepped arrangement and for locking the units together.

With the foregoing in mind, a primary objective of the present invention is the provision of an end panel construction for modular units, and to a modular unit embodying such end panels, in which all of the shortcomings and drawbacks of the prior art referred to above are eliminated.

Another object is the provision of an end panel construction, especially for mounting on the end of a modular unit, which is strong but relatively inexpensive and which will interfit with a complementarily shaped end panel on another modular unit.

BRIEF SUMMARY OF THE INVENTION

According to the present invention, first and second end panels adapted for mounting on the ends of modular units, especially wheel supported modular units, are provided with vertical undulations which are complementary to one another so that, when the panels are presented to one another in face to face relation, the undulations will nest together.

The pitch of the undulations in the lateral direction is advantageously one-fourth of the width of a panel so that the panels will interfit or nest together in a laterally aligned position or in position displaced one-fourth or one-half the width of the panel in either direction.

The panels are, furthermore, formed with transversely extending and complementarily shaped tongues and grooves which are advantageously inclined in the horizontal direction so that, when the panels are placed together in face to face relation, the tongue on each panel engages the groove in the other thereby aligning the panels in the vertical direction while, at the same time, locking the panels together against separating movement in the horizontal direction.

Mobile modular units having one panel of one type mounted on one end and a panel of the other type mounted on the opposite end can be arranged in end to end relation and will be locked together and fixedly aligned. Such modular units could serve, for example, for dispensing food, as in a cafeteria or in buffet style.

Each panel is formed from plastic material and on the side facing away from the unit on which it is mounted presents rounded corners. The tongue on each panel protrudes outwardly therefrom on the side facing away from the unit on which the panel is mounted and can, thus, serve as a bumper. The tongue is, furthermore, disposed near the top of the panel and may be interrupted in one or more regions therealong and have a handle connected thereto for manipulation of the respective modular unit.

The exact nature of the present invention will become more apparent upon reference to the following detailed specification taken in connection with the accompanying drawings in which.

DETAILED DESCRIPTION OF THE INVENTION

Figure 1:
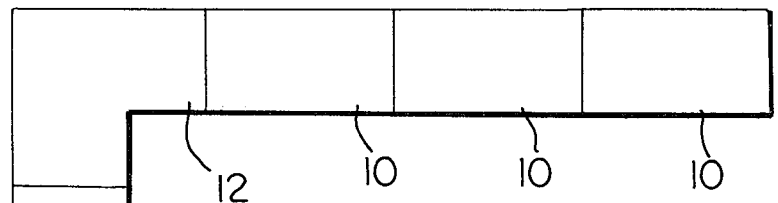
FIG. 1 is a plan view showing a simple modular unit arrangement forming a cafeteria line or a buffet line and including a right angle modular unit in the corner.

Referring to the drawings somewhat more in detail, in FIG. 1, rectangular modular units indicated at 10 and a right angle modular unit indicated at 12 are arranged in end to end relation to form, for example, a food serving line. Each modular unit has a top panel which may be recessed for receiving hot wells or the like and the food serving line is provided on one side or the other, or both sides, with a support for slidably supporting trays.

Figure 2:
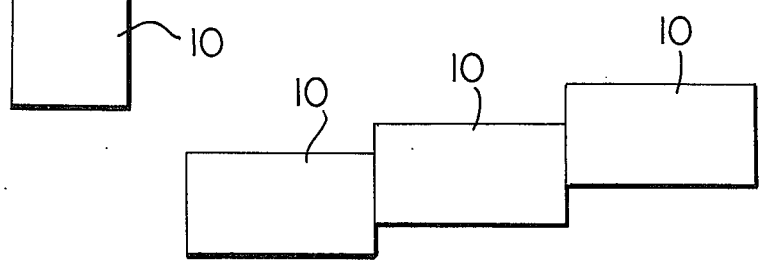
FIG. 2 is a schematic view showing three modular units which are offset from one another laterally in a saw tooth arrangement.

FIG. 2 illustrates another arrangement that can be made of the rectangular modular units 10 and in which each modular unit is offset laterally from the next adjacent one thereof. In this case, the arrangement for slidably supporting the trays would not be continuous along the entire row of modular units.

As will be seen hereinafter, the modular units in FIGS. 1 and 2 have the top surfaces coplanar and in abutting relation while the modular units are also held together against lateral movement relative to one another.

In either of the FIGS. 1 or 2 arrangements, each of the modular units has specially constructed end panels on the opposite ends thereof except that the terminal modular units are not necessarily provided with specially constructed panels on the outer ends thereof. In most case, as a practical matter, each unit will be provided with specially constructed end panels on the opposite ends thereof.

Figure 3:
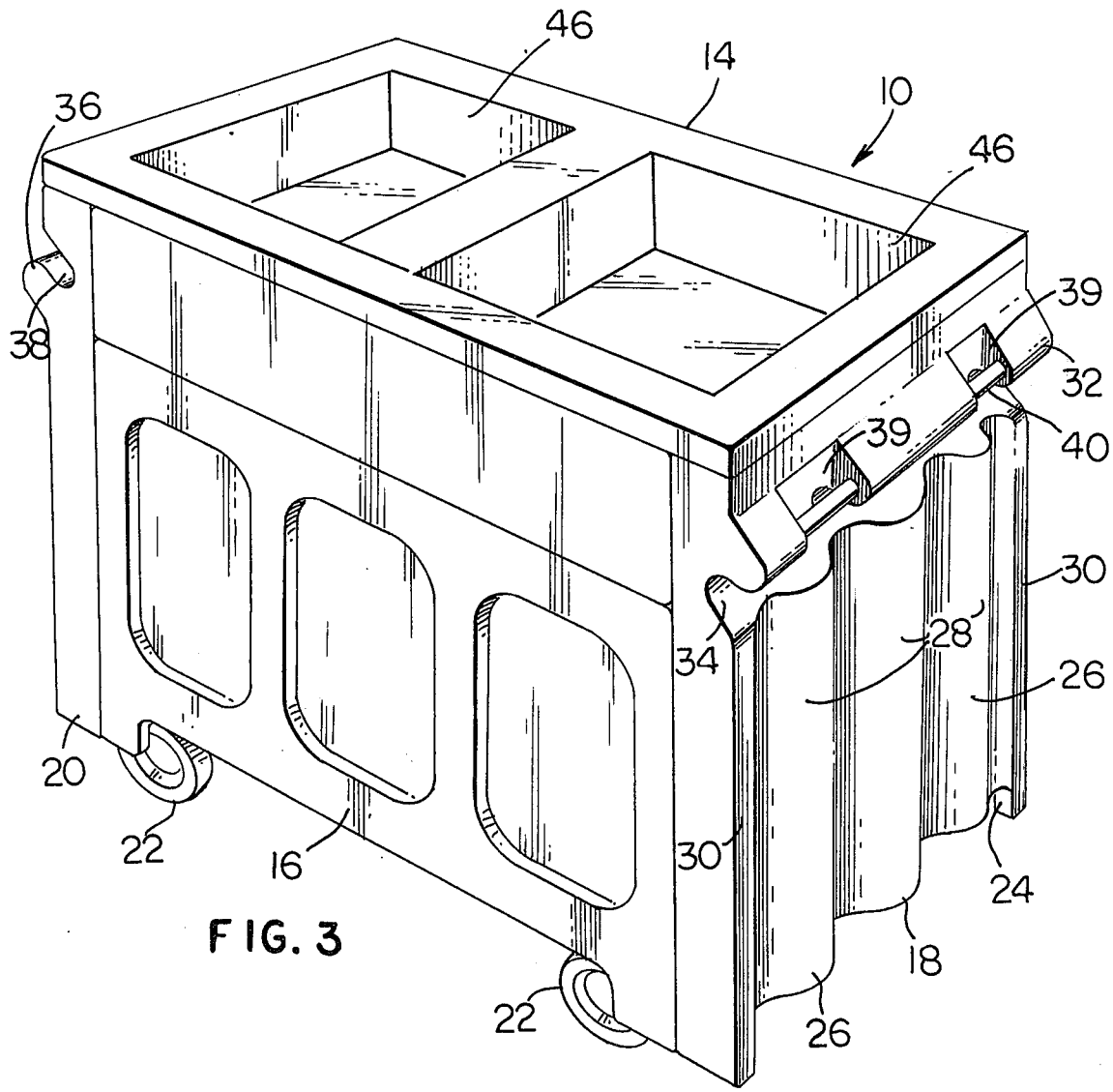
FIG. 3 is a perspective view showing a modular unit having end panels thereon constructed according to the present invention.

Turning now to FIG. 3, a typical modular unit 10 is illustrated therein and will be seen to comprise a top 14, sides 16, of which only one will be seen in FIG. 3, and ends 18 and 20. The ends 18 and 20 may form an integral part of the modular unit which can also be in the form of individual end panels connected to the frame of the unit. The unit in FIG. 3 is advantageously provided with supporting wheels 22 which are set inwardly from the end panels 18 and 20 and one or more of the wheels may be provided with a foot operated or hand brake mechanism which is not shown in the drawings.

Each of the end panels 18 and 20 has an upwardly extending lateral recess region 24 which provides toe space for anyone moving the cart about and also provides access to the not shown foot operated or hand brake mechanism.

Each of the end panels 18 and 20 is formed with vertically extending curved convolutions generally indicated at 26 on end panel 18. The convolutions on panel 18 are complementary to those on panel 20 so that, if a panel 20 is placed in face to face relation with panel 18, the convolutions will interfit. Furthermore, as will be seen in panel 18, the convolutions formed thereon comprise three full ridge portions 28 uniformly distributed across the panel and two half ridge portions 30 at the side edges of the panel, the said ridge portions defining four recesses therebetween.

Since panel 20 has convolutions thereon formed complementary to those on panel 18, it will be evident that the two panels can be nested together with the convolutions in interengagement in a plurality of laterally shifted positions and will be held against relative lateral movement in such positions.

Towards the upper region of each of the end panels, each end peanel is formed with an inclined tongue 32 and an inclined recess, or groove, 34 adjacent thereto. In respect of panel 18, the tongue 32 inclines downwardly in the outward direction at a predetermined angle and the groove 34 inclines downwardly in the outward direction at about the same angle and the tongue is disposed above the groove. Both the tongue and groove extend laterally completely across the end panel 18.

In respect of end panel 20, a corresponding tongue and groove arrangement is provided except in the case of panel 20 tongue 36 is below groove 38 and both thereof incline upwardly in the outward direction. The tongues and grooves described are at a slightly different height and will interfit when a panel 20 is placed in face to face engagement with a panel 18 and, due to the inclined tongues and grooves, will lock the panels together against relative movement in the horizontal direction.

Figure 4:
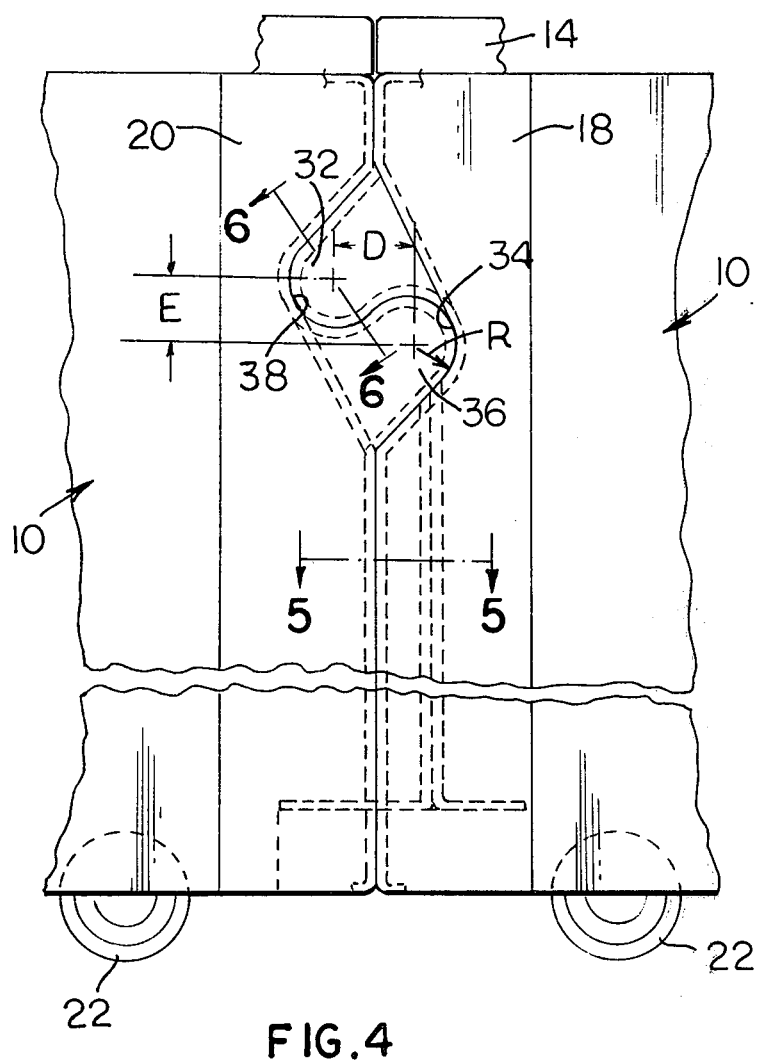
FIG. 4 is a side view drawn at enlarged scale showing how two panels interfit and interlock when in face to face relation.

The particular manner in which the panels interfit is shown more in detail in FIG. 4 in which a panel 20 is interfitted with a panel 18. It will be noted that the vertically extending convolutions 26 are in interfitting engagement as well as the tongues and grooves so that the two modular units on which the panels 18 and 20 are mounted are in a condition of vertical alignment and are held against lateral movement in the lateral direction.

It is advantageous to form the tongues and grooves about as illustrated with the radius of curvature of each tongue being the same and, also, the same as the radii of curvature of the grooves. A practical radius is about 1 ¼ inches. The distance between the centers of curvature of the tongue and groove combination on each panel may be about 1 ½ inches and the vertical spacing between the said centers of curvature may be about 2 inches. The first mentioned dimensions indicated at D and the second mentioned dimensions at E and the radii referred to are indicated at R.

Figure 6:
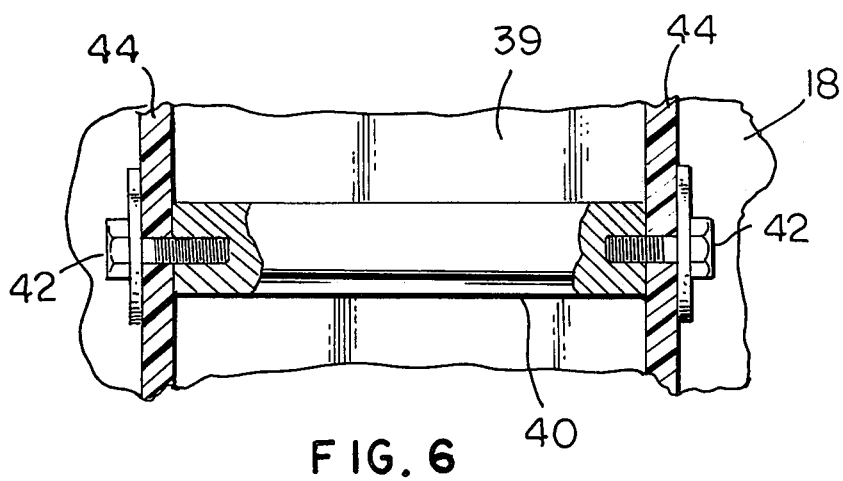
FIG. 6 is a sectional view indicated by line 6—6 on FIG. 4 showing how a handle member can be connected into the tongue of the respective unit.

One or both of the tongues 32, 36 may be interrupted in the axial direction to form gaps 39 and mounted in the gaps are tubes 40 forming handles for manipulation of the modular unit when it is moved about. Each handle 40 may be mounted in the respective gap 39 as shown in FIG. 6 wherein cap screws 42 are threaded into the ends of the handle 40 and extend through the walls 44 which define the ends of the gap 39. The respective panel, in this case, panel 18, is open to the rearward side so that no problems present themselves in putting the cap screws 42 in place and tightening the cap screws to hold the handle firmly.

It will be appreciated that all corners on the panels which face outwardly from the modular unit are rounded so that the modular unit is protected as well as the rounded corners also protecting doors and walls and individuals that might come into contact with the modular unit.

The top 14, in many cases, can be in the form of a stainless steel panel that might be formed with one or more apertures 46 into which hot wells or cold wells or other food containers can be placed. The present invention is not, however, concerned with the particular construction of top panel 14 although it is pointed out that the two modular units are in end to end relation and interlocked by means of specially contoured configurations thereon, the top panels 14 of the units will be in coplanar abutting relation.

It will be seen from FIG. 4 that adjacent modular units can readily be secured together merely by lifting the unit 18 slightly to engage the tongue 32 thereon with groove 38 of the opposed panel 20. It is also the case that the tongues could be formed to cam over one another so that the units could merely be pushed together and become locked together in response to this action.

Figure 5:
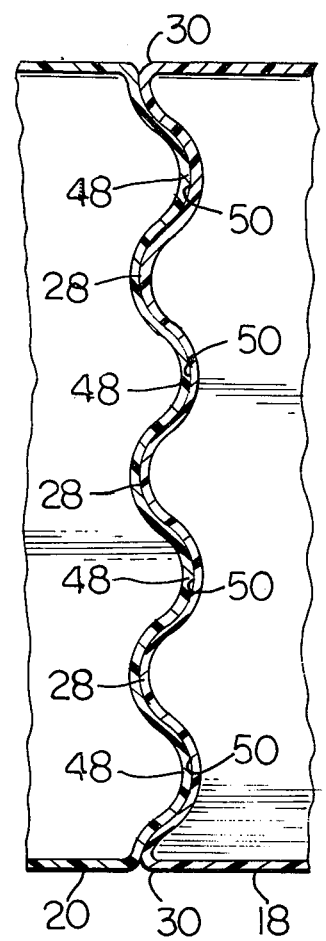
FIG. 5 is a plan sectional view indicated by line 5—5 on FIG. 4 showing how the undulations are formed in the two interengaged panels in FIG. 4.

As will be seen in FIG. 5, whereas end panel 18 has three full peaks distributed thereacross and half peaks at the end, end panel 20 has four full peaks thereon, indicated at 48, each of which is receivable in any of the recessed regions 50 of end panel 18.

With the arrangement illustrated in FIG. 5, it will be apparent that panels 18 and 20 can be nested together not only in laterally aligned positions but in positions in which one of the panels is displaced by either one-fourth or one-half of the width thereof in either direction relative to the other panel. The panels will still be locked together and in predetermined relative positions in the transverse direction.

Modifications may be made within the purview of the appended claims.

What is claimed is:

1. End panel construction, especially for a service counter unit having a frame with sides and ends and a top; first and second end panels for mounting in vertical relation on opposite ends of a frame or on the opposed ends of adjacent frames and comprising respective complementary contoured portions aligned in a first direction which interfit when the panels are in opposed face to face abutting relation, to align said panels in said first direction relative one another and limit relative movement of said panels in a horizontal direction substantially parallel to the plane of said face to face abutment; said first and second end panels also comprising complementary formed elements of latch means thereon which interfit and latch the first and second end panels together in registration and limit relative movement of the panels in a substantially vertical direction and in a horizontal direction substantially orthogonal to the plane of said face to face abutment when the panels are in said opposed face to face abutting relation.

2. End panel construction according to claim 1 in which said complementarily contoured portions on said first and second end panels comprise vertically extending ridge means and intervening recess means which locate a pair of modular units on which the respective panels are mounted in the side to side direction when the panels are in face to face abutting relation with ridge means and recess means in interfitting relation, said elements of latch means on said panels comprising laterally extending tongue and groove means formed thereon which align the panels and a pair of modular units on which the panels are mounted in the vertical direction when the tongue and groove means on the respective panels are in interfitting relation.

3. End panel construction according to claim 2 in which said tongue and groove means are disposed at an angle to the plane of the respective panel and are operable to latch a said first end panel to a said second end panel together against relative longitudinal movement when the tongue and groove means of a said first end panel interfits with the tongue and groove means on a said second end panel.

4. End panel construction according to claim 1 in which said contoured portions on said first and second end panels comprise vertically extending undulations formed therein.

5. End panel construction according to claim 4 in which said undulations comprise a plurality of uniformly laterally spaced undulations distributed across the width of the respective end panel and providing for a plurality of laterally shifted relative positions of said panels with at least a single undulation on the first end panel interfitted with an undulation on the opposed second end panel.

6. End panel construction according to claim 1 in which said elements of latch means formed on said first and second end panels comprise a laterally extending angularly inclined tongue and a laterally extending angularly inclined groove adjacent thereto on each of said panels, the tongue and groove on one of said end panels inclining downwardly at a predetermined angle and the tongue and groove on the other of said end panels inclining upwardly at the same said angle, the said tongue on each panel protruding outwardly therefrom on the side of the panel which faces outwardly when the panel is mounted on a frame.

7. End panel construction according to claim 1 in which said first and second end panels are mounted on the same modular unit frame and are angularly related and are nonparallel when the respective modular unit is viewed from above.

8. End panel construction according to claim 1 in which said end panels are molded plastic material and said contoured portions and elements of latch means are integrally formed thereon.

9. End panel construction according to claim 1 which includes a plurality of wheel supported modular unit frames each having a said front end panel mounted on one end and a said second end panel mounted on the opposite end, siad modular units adapted for being latched together in end to end relation to form an elongated serving area.

10. End panel construction according to claim 9 in which each frame has a horizontal top member thereon, said top member being coplanar end to end relation when said counter units are latched together.

11. End panel construction according to claim 1 in which the corners and edges of the panels which face outwardly when the panels are mounted on frames are rounded.

12. End panel construction, especially for a service counter unit having a frame with sides and ends and a top; first and second end panels for mounting in vertical relation on opposite ends of a frame or on the opposed ends of adjacent frames and comprising respective complementary contoured portions which interfit when the panels are in opposed face to face abutting relation, said first and second end panels also comprising complementary formed elements of latch means thereon which interfit and latch the first and second end panels together in registration in the vertical direction when the panels are in said opposed face to face abutting relation, said contoured portions on said first and second end panels comprise vertically extending undulations formed therein, said undulations comprise a plurality of uniformly laterally spaced undulations distributed across the width of the respective end panel and providing for a plurality of laterally shifted relative positions of said panels with at least a single undulation on the first end panel interfitted with an undulation on the opposed second end panel, said elements of latch means formed on said first and second end panels comprising an inclined tongue and an inclined groove adjacent thereto on each end panel, the tongue and groove on said first end panel inclining downwardly at a predetermined angle and the tongue and groove on said second end panel inclining upwardly at the same angle, said tongues and grooves extending laterally across substantially the entire width of the respective end panels, and the tongue and groove on the first end panel interfitting with the groove and tongue respectively on the second end panel in all adjusted positions of the said panels laterally in which undulations on the opposed first and second end panels interfit.

13. End panel construction, especially for a service counter unit having a frame with sides and ends and a top; first and second end panels for mounting in vertical relation on opposite ends of a frame or on the opposed ends of adjacent frames and comprising respective complementary contoured portions which interfit when the panels are in opposed face to face abutting relation, said first and second end panels also comprising complementary formed elements of latch means thereon which interfit and latch the first and second end panels together in registration in the vertical direction when the panels are in said opposed face to face abutting relation, said elements of latch means formed on said first and second end panels comprise a laterally extending angularly inclined tongue and a laterally extending angularly inclined groove adjacent thereto on each of said end panels, the tongue and groove on one of said end panels inclining downwardly at a predetermined angle and the tongue and groove on the other of said end panels inclining upwardly at the same said angle, the said tongue on each panel protruding outwardly therefrom on the side of the panel which faces outwardly when the panel is mounted on a frame, said frame having a said first end panel on one end and a said second end panel on the other end, support wheels on the bottom of the frame rollingly supporting said frame, at least the downwardly inclined tongue being above the said groove adjacent thereto, said tongue being interrupted in the axial direction by gap means, and handgrip means connected to the respective end panel and disposed in the said gap means formed in said tongue, said handgrip means providing for manipulation of the respective frame.

14. End panel construction for modular units, each having a frame with sides, planar vertical end panels, and a top, the end panels on adjoining units being in opposed facing abutting relation; that improvement comprising at least one first complementary interfitting surface contour aligned in a first planar direction being on each of the facing end panels for aligning said panels in said first planar direction and at least one second complementary interfitting surface contour aligned in a second planar direction angularly related to said first planar direction on each of the facing panels for aligning said panels in said second planar direction in angular relation to said first direction to thereby relatively position, locate, and align said end panels in two planar directions.

15. A device according to claim 14 wherein said second contour on one of the facing end panels interlocks the contour on the other of the facing end panels to thereby limit relative movement between said end panels in a direction orthogonal to the planes of said end panels.

16. A device according to claim 15 wherein there are a plurality of said first contours comprising parallel elongate undulations; the undulations on one panel interfitting and complementary to the undulations on the facing end panel.

17. The device according to claim 16 wherein said second contours comprise at least one tongue and groove formed on each end panel; the tongues on each end panel being inclined to the respective planes of their panels; the angles of inclination of said tongues being equal and opposite whereby said tongues on each panel are interlocking and will interfit and be complementary to the groove on the other end panel.

* * * * *

UNITED STATES PATENT AND TRADEMARK OFFICE
CERTIFICATE OF CORRECTION

PATENT NO. : 4,008,931
DATED : February 27, 1977
INVENTOR(S) : Robert J. Kennedy, Jr. and Kendall S. Smith II It is certified that error appears in the above-identified patent and that said Letters Patent are hereby corrected as shown below:

Col. 3, line 50, "peanel" should be --- panel ---

Col. 5, line 65 (Claim 6) "end" omitted between "said" and "panels"

Col. 6, line 17 (Claim 9) "siad" should be --- said ---

Col. 6, line 22 (Claim 10) "in" omitted between "being" and "coplanar"

Signed and Sealed this

Thirty-first Day of May 1977

[SEAL]

Attest:

RUTH C. MASON
*Attesting Officer*

C. MARSHALL DANN
*Commissioner of Patents and Trademarks*